(12) United States Patent
Peresan

(10) Patent No.: US 7,168,569 B2
(45) Date of Patent: Jan. 30, 2007

(54) VIBRATORY SCREENING MACHINE FOR EARTH DRILLING INSTALLATION

(75) Inventor: Michael L. Peresan, Strykersville, NY (US)

(73) Assignee: Derrick Corporation, Buffalo, NY (US)

( * ) Notice: Subject to any disclaimer, the term of this patent is extended or adjusted under 35 U.S.C. 154(b) by 38 days.

(21) Appl. No.: 10/400,257

(22) Filed: Mar. 27, 2003

(65) Prior Publication Data

US 2004/0206673 A1 Oct. 21, 2004

(51) Int. Cl.
*B07B 1/46* (2006.01)
*F16J 15/00* (2006.01)
*E21B 21/06* (2006.01)

(52) U.S. Cl. .................. 209/246; 209/371; 175/66; 277/647

(58) Field of Classification Search .............. 209/240, 209/243, 244, 246, 370, 371, 372, 404, 405; 175/66, 206; 166/267; 210/297, 384, 418, 210/499; 277/628, 630, 637, 644, 647 X
See application file for complete search history.

(56) References Cited

U.S. PATENT DOCUMENTS

| | | | | |
|---|---|---|---|---|
| 2,047,713 A | * | 7/1936 | Simpson | 209/240 |
| 2,576,283 A | * | 11/1951 | Chaney | 175/66 |
| 3,624,970 A | * | 12/1971 | Balz | 451/326 |
| 3,862,519 A | * | 1/1975 | Van Fossen | 451/326 |
| 4,257,266 A | * | 3/1981 | Apple | 73/152.19 |
| 4,814,071 A | * | 3/1989 | Lower | 209/243 |
| 4,882,054 A | * | 11/1989 | Derrick et al. | 210/389 |
| 4,911,834 A | * | 3/1990 | Murphy | 210/167 |
| 5,896,998 A | * | 4/1999 | Bjorklund et al. | 209/326 |
| 6,244,362 B1 | * | 6/2001 | Williams | 175/206 |
| 2003/0006201 A1 | * | 1/2003 | Boutte et al. | 210/768 |
| 2005/0242009 A1 | * | 11/2005 | Padalino et al. | 210/86 |

* cited by examiner

Primary Examiner—Joseph C. Rodriguez
(74) Attorney, Agent, or Firm—Conley Rose, P.C.

(57) ABSTRACT

An oil and gas drilling installation having a drill rig with a bell nipple having an outlet at a predetermined elevation, a screening machine having a feeder and an angularly adjustable vibratory frame, a weir positioned between the feeder and the vibratory frame, the weir having an elevation which is lower than the predetermined elevation of the outlet of the bell nipple but immediately above the portion of the screen frame adjacent to the weir, and a downwardly inclined conduit between the bell nipple conduit and the feeder. A vibratory screening machine and feeder combination including an angularly adjustable vibratory frame on the vibratory screening machine, and a weir and flexible seal between the feeder and the vibratory frame at an elevation which is immediately above the portion of the vibratory frame which is adjacent to the weir.

9 Claims, 8 Drawing Sheets

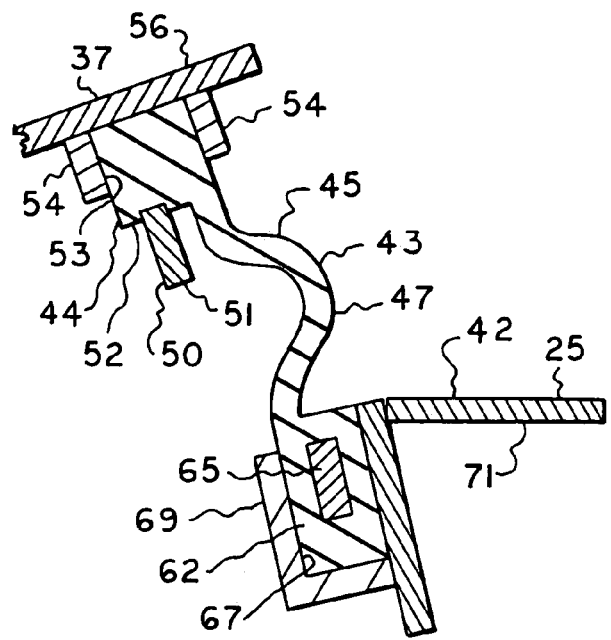
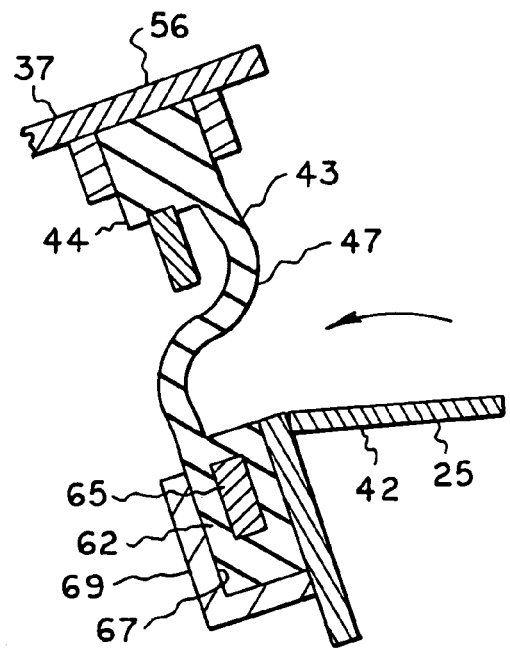
FIG. 7A
FIG. 7B
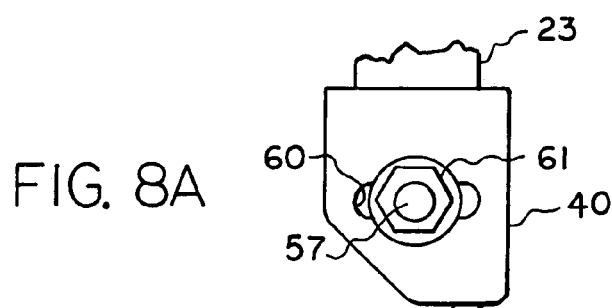
FIG. 8A
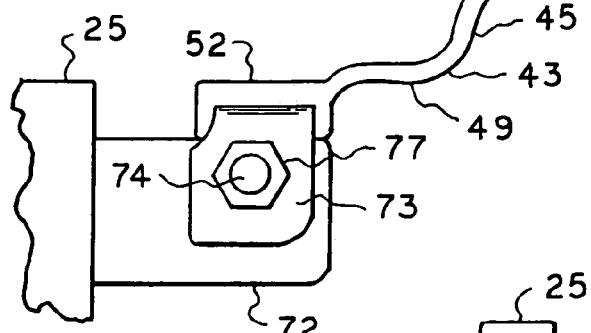
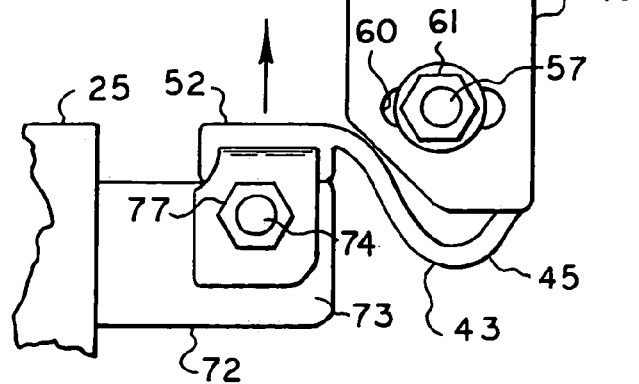
FIG. 8B

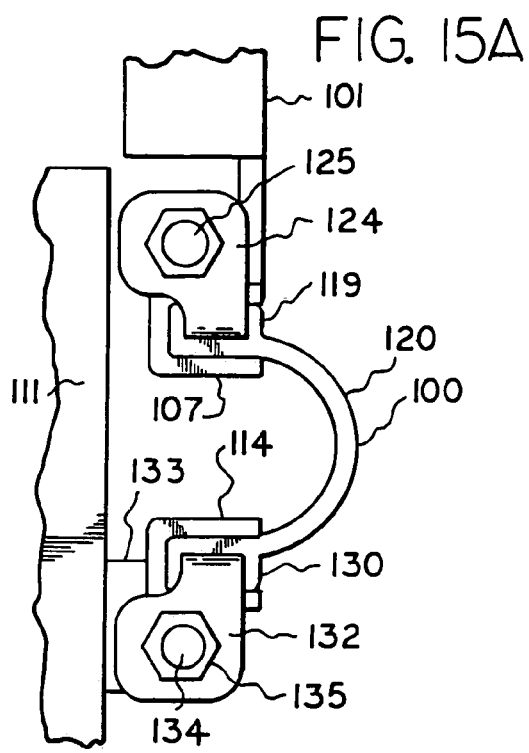
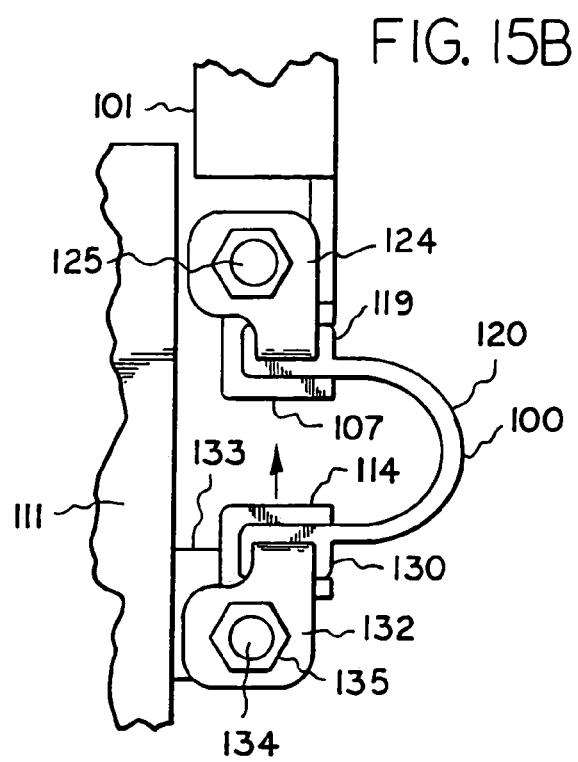
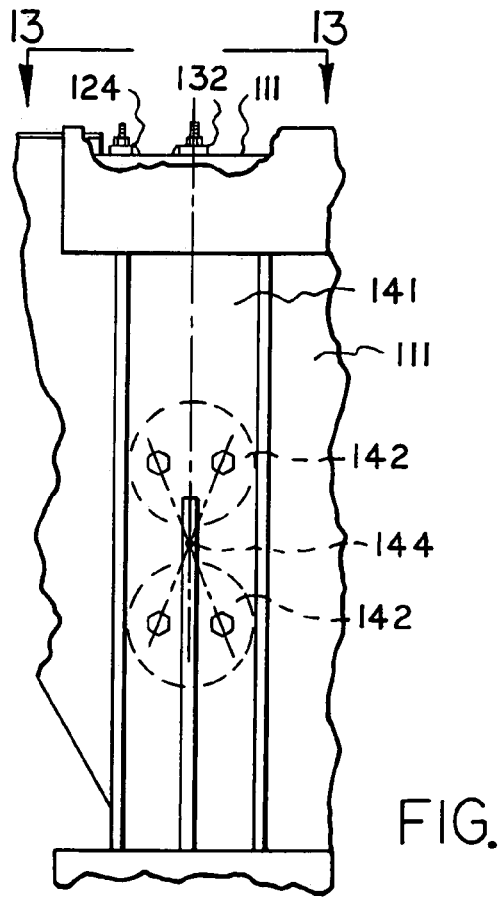
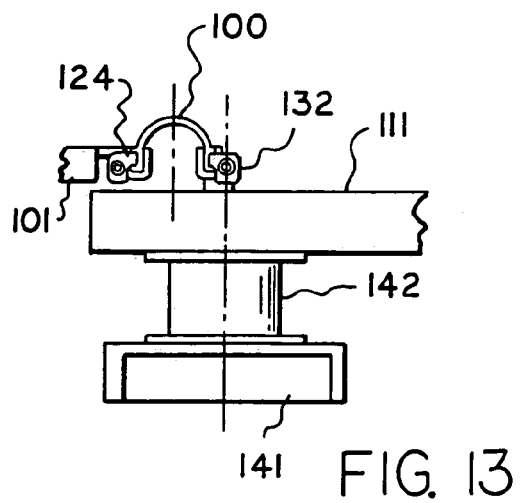

VIBRATORY SCREENING MACHINE FOR EARTH DRILLING INSTALLATION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to an improved vibratory screening machine and feeder combination and to an oil or gas earth drilling installation utilizing said vibratory screening machine and feeder combination.

By way of background, a drill platform for drilling for oil or gas includes a drill rig having a drill casing and a bell nipple. Drilling mud is supplied through the drill casing for lubricating the drill and carrying drilled materials back to the surface. The drilled materials carried by the drilling mud are discharged from the bell nipple. The drilled materials may include rock, shale, clay or sand or combinations thereof. The drilling mud is separated from the drilled materials in a vibratory screening machine and reused. A conventional vibratory screening machine includes a feeder which receives the outflow from the bell nipple and an angularly adjustable vibratory frame having a screen bed on which screens are mounted. The feeder discharges the material to be screened onto the screen bed. The screen bed of the vibratory screening machine must be angularly adjusted for properly screening different compositions of drilled materials. The vibratory frame is positioned above a hopper which receives the drilling mud which passes through the screen bed. The height of the hopper determines the elevation of the screen bed, and the outflow from the feeder is above the screen bed. In the conventional screening machine the vibratory frame must have a walled construction proximate the feeder in order to retain the outflow of the feeder on the screen bed. Therefore, the outflow from the feeder has to be at least a foot above the screen bed to get over the walled structure of the vibratory frame. Also, the feeder is not physically connected to the screen bed because otherwise vibrations of the vibratory frame would be transmitted thereto. Additionally the feeder is not connected to the screen bed because the screen bed must be separate from the feeder so that it can be angularly adjusted.

It is conventional to conduct the outflow of the bell nipple to the screening machine by a gravity feed, especially considering that it is impractical to pump drilled materials containing rocks and shale. In order to have the desired gravity feed from the bell nipple, to the feeder of the conventional screening machine, the conventional screening machine must therefore be placed in a lowered position on the drill platform. This may be difficult to achieve because of space and structure limitations on the drill platform. Therefore, the lower the outflow from the feeder, that is, the closer the outflow from the feeder to the screen bed, the easier it will be to have the outflow of the bell nipple higher than the outflow from the feeder without requiring specialized placements of the vibratory screening machine on a drill platform.

BRIEF SUMMARY OF THE INVENTION

It is accordingly one object of the present invention to provide an improved combination of a feeder and vibratory screening machine having an angularly adjustable vibratory frame wherein the outflow of the feeder is positioned much closer to the screens on the screen bed than is possible in a conventional vibratory screening machine.

It is another object of the present invention to provide an improved combination of a feeder and a vibratory screening machine having an unique seal structure between the feeder and the angularly adjustable frame of the vibratory screening machine.

A further object of the present invention is to provide an improved combination of a feeder and vibratory screening machine which can be supplied by gravity feed from a bell nipple and has greater latitude of placement on a drilling platform than a conventional combination of a feeder and vibratory screening machine. Other objects and attendant advantages of the present invention will readily be perceived hereafter.

The present invention relates to a vibratory screening machine and feeder combination comprising a feeder, a vibratory screening machine, an angularly adjustable vibratory frame on said vibratory screening machine, a weir between said feeder and said adjustable vibratory frame, and a seal between said weir and said adjustable vibratory frame.

The present invention also relates to an oil and gas drilling installation having a drill rig with a bell nipple having an outlet at a predetermined elevation, the improvement of a screening machine having an angularly adjustable vibratory frame, a feeder for said screening machine, a weir positioned between said feeder and said vibratory frame, said weir having an elevation which is lower than said predetermined elevation of said outlet of said bell nipple, said vibratory frame having a portion adjacent said weir, a seal between said weir and said portion of said adjustable vibratory frame, and a conduit between said bell nipple and said feeder, said conduit being downwardly inclined toward said feeder.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 7A is an enlarged cross sectional view taken substantially along line 7A—7A of FIG. 2 and showing in greater detail the structure of the seal between the weir on the feeder and the screen bed with the contour of the seal web in that position;

FIG. 7B is a view similar to FIG. 7A but showing the contour of the seal web in the position which it assumes when the end of the screen frame remote from the feeder is raised from the position which it was in FIG. 7A;

FIG. 8A is a fragmentary plan view taken in the direction of arrows 8A—8A of FIG. 2 and showing the relative positions of the adjacent corners of the feeder and the screen frame and the contour of the seal web when the ends of the feeder and the screen frame are in the position of FIG. 7A;

FIG. 8B is a view similar to FIG. 8A but showing the relative positions of the corners of the feeder and the screen frame and the contour of the seal web when the ends of the feeder and the screen frame are in the positions of FIG. 7B;

FIG. 12 is an enlarged fragmentary side elevational view of the end of the vibratory screening machine of FIG. 11 adjacent the feeder;

FIG. 13 is a fragmentary view taken substantially in the direction of arrows 13—13 of FIG. 12 and showing both the support between the stationary and vibratory frames of the screening machine and also showing the connection of the seal between the feeder and the vibratory frame;

FIG. 15A is a fragmentary view taken substantially in the direction of arrows 15A—15A and showing the connections of the combined weir and seal between the feeder and the vibratory frame and also showing the contour of the screen web in the position of FIG. 9; and FIG. 15B is a view similar to FIG. 15A but showing the relative positions of the corners of the feeder and the vibratory frame when the end of the vibratory frame remote from the feeder has been raised from the position represented by FIG. 15A.

DETAILED DESCRIPTION OF THE INVENTION

Figure 1:
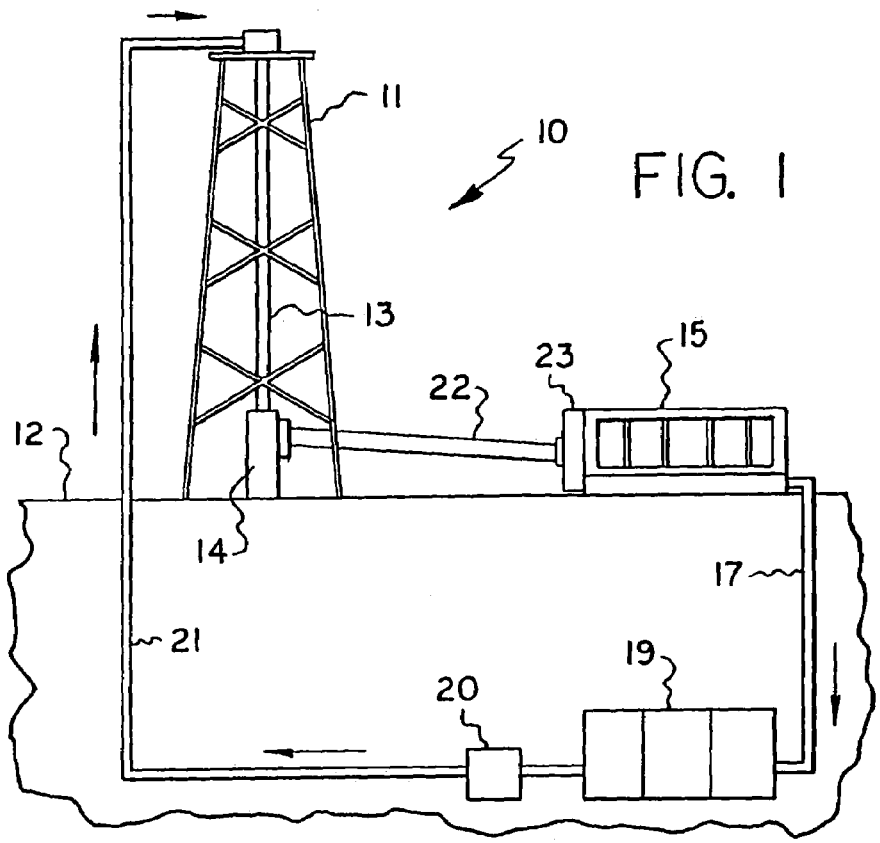
FIG. 1 is a schematic representation of a drill rig installation which includes a screening machine for recovering drilling mud.

By way of further background, in FIG. 1 an oil and gas drilling platform 10 is shown having a drill rig 11 mounted on a surface 12. The drill rig 11 is of conventional structure and it includes a drill casing 13 having its lower end associated with a bell nipple 14 in the conventional manner. As is well known in the art, the drill is driven through the drill casing and successive lengths of pipe are lowered through the bell nipple. Drilling mud is provided through the drill casing for its usual purposes of providing drill lubrication and for conveying the drilled earthen materials back to the bell nipple. The drilled earthen materials, such as sand, clay, shale and rock, flow out of the outlet of the bell nipple along with the drilling mud through conduit 22 to the feeder 23 associated with a vibratory screening machine 15. In the vibratory screening machine, the drilling mud is separated from the remainder of the earthen materials and is conducted through conduit 17 to settling tanks 19 from which it is pumped by pump 20 through conduit 21 back to the drill casing 13 for reuse.

The drilled earthen materials, as noted above, may consist of any one of sand, clay, shale or rock or combinations thereof, depending on the composition of the subsoil layer at which the drill is then operating. A gravity feed conduit 22 is positioned between the bell nipple outlet and the feeder 23 associated with the vibratory screening machine 15. The conduit 22 may be a pipe or a trough through which the earthen materials and drilling mud flow by gravity from the bell nipple to the screening machine. The screening machine and feeder may be located relatively close to the drill rig on a surface which is substantially level with the drill rig, but it need not be.

The outlet from the feeder 23 onto the vibratory frame 25 of the screening machine 15 has to be at a lower elevation than the outlet of the bell nipple 14 so that the drilled materials and the drilling mud can also drop by gravity onto the screen bed 41 of the vibratory frame. As is well known, the earthen materials are discharged off of the end of the screening machine 15 while the drilling mud, as noted above, is conducted to the settling tanks 19. If the installation is a sea platform, the settling tanks 19 can be positioned at a level below the drilling mud outlet of the screening machine so that the feed thereto can be by gravity. If the installation 10 is mounted on the earth, the drilling mud can be pumped to the settling tanks. In any event, in either installation, the drilling mud has to be pumped back to the drill casing 13, as by a pump 20. The feeder 23 and vibratory screening machine 15 can be located relatively close to the drill rig, and therefore the foregoing drilling mud circuit can be relatively short which results in a shorter reclamation time for the drilling mud.

As noted above, the outlet of the feeder 23 has to be at a lower elevation than the outlet of the bell nipple to permit flow therefrom by gravity onto the screen bed. Accordingly, a special weir and seal structure 24 is provided between the feeder 23 and the vibratory frame 25 of vibratory screening machine 15. The feeder 23 is essentially a tank having an inlet at the bottom thereof which is at the terminal of downwardly inclined conduit 22. The feeder includes a rear wall 27, upper side walls 29, lower side walls 30, a bottom wall 31 and a front wall 32 consisting of a lower portion 33 and an upper curved portion 34. The lower portion 33 extends all the way between side walls 29. A gusset-shaped plate 35 is located at each side of the feeder, and a top plate 38 of the front wall has its opposite ends joined to the edges of gusset-plates 35. The curved portion 34 is joined to the bottom edge of plate 38 and to the lower edges of gussets 35. A curved U-shaped weir 37 has its U-shaped inner edge 39 joined to front wall 32. The weir terminates at its upper end at tabs 40. The feeder 23 is fluid-tight so that flow which enters through conduit 22 exits through the area at weir surface 37.

The outflow over weir surface 37 is at a lower elevation than the outlet of bell nipple 14, which permits gravity flow to screen bed 41 of the vibratory frame 25 of vibratory screening machine 15. The gravity flow is possible when the screening machine is on a level which is substantially even with the drill rig because the weir is at a lower elevation than the outflow from the bell nipple, and this lower elevation is possible because the presence of a seal between the weir and the angularly adjustable vibratory frame eliminates the need for walls which are required with the vibratory frames of conventional machines. The elevation of the weir plate 56 should be very close to the elevation of the adjacent portion of vibratory screen frame 42 which is attached to seal 43 (FIG. 7A). In an actual feeder and vibratory frame combination, the weir plate 56 was on the order of about two to three inches above the adjacent portion of the vibratory frame as compared to at least about a foot in conventional machines. In certain instances the elevation of the vibratory frame may even be slightly above the elevation of the weir, as permitted by the flexible seal. It will be appreciated that a seal may permit more than about two to three inches difference in elevation between a weir and an adjacent vibratory frame, but this difference may still be much less than about a minimum of one foot difference in conventional machines. The main consideration is that the seal has eliminated the need for walls on a vibratory frame which require the above-mentioned at least of about a one foot difference. The U-shaped weir 37 is attached to the end 42 of the vibratory frame 25 by a flexible seal 43 which is secured in a fluid-tight manner between weir 37 and the end 42 of vibratory frame 25. In this respect, flexible seal 43 includes a U-shaped bead 44 (FIGS. 3 and 7A) which is molded integrally with overall generally U-shaped flexible web 45 having a central portion 47 and upstanding sides 49. A U-shaped clamping bar 50 has a central section 51 which bears on the underside 52 of bead 44 and forces it into channel 53 which is defined by channel sides 54 secured to the underside of weir plate 56 of weir 37 and to the outer sides 55 of U-shaped weir 37 which extend upwardly from plate 56. Bolts 57 which extend outwardly from the upper ends of legs 59 of clamping bar 50 extend through slots 60 (FIG. 8A) in tabs 40, and the clamping bar 50 forces bead 44 into channel 53 upon the tightening of nuts 61 to thereby provide a fluid-tight seal between bead 44 and the underside of U-shaped weir 37.

A fluid-tight seal is also provided between the end 42 of vibratory frame 25 and seal 43. In this respect a U-shaped bead 62 is molded integrally with seal web 45. The bead 62 has a straight bottom portion 63 and upstanding legs 64. A U-shaped metal bar 65 is molded integrally with bead 62. A U-shaped channel 67 has a bottom section 69 and upstanding legs 70. The U-shaped bead 62 fits into U-shaped channel 67 which is formed on the end plate 71 of the vibratory frame 25. Tabs 72 are formed proximate the upper edges of side 71, and tabs 73 are formed at the upper ends of U-shaped metal bar 65. Bolts 74, which extend outwardly from tabs 72, extend through holes 75 in tabs 73, and when nuts 77 are tightened onto bolts 74, the bead 62 of seal 43 is drawn into sealing engagement with channel 67 on plate 71 on the end of vibratory frame 25. Thus, a U-shaped seal 43 is provided between weir 37 and the end of vibratory frame 25 so that when the level of the contents in feeder 23 rise above the lowermost portion of the weir 37, it will flow onto the immediately adjacent portion of screen bed 41 which has a vibratory screen 79 thereon.

The flexibility of the web 45 of the seal 43 permits the seal to be maintained as the vibratory frame 25 is adjusted to different inclinations, as may be required to meet varying conditions of operation as different substrates are encountered during the drilling of a single well. For example, if the screen bed is at a certain inclination and the conveyance of the material which is being screened has to be increased because of a change in substrate conditions, the screen bed may have its inclination away from the feeder decreased. On the other hand, if the conveyance is too rapid so that sufficient drilling mud is not screened out, the angle away from the feeder may be increased away from the feeder to thereby slow down conveyance. Also, there are situations when multiple screening machines are being operated simultaneously with a single drill rig. Therefore, when screens have to be replaced on one or more of the machines so they are shut down, the conveyance of other machines of the multiple screens may be increased by lowering the inclination of the screen bed to maintain a sufficiently rapid flow of material to be screened.

Figure 4:
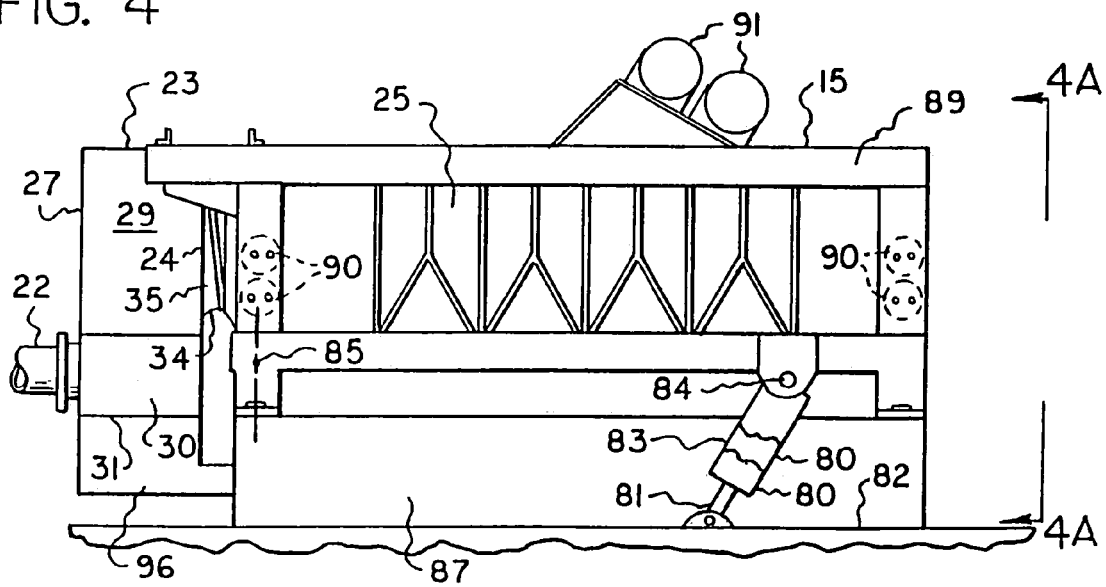
FIG. 4 is a schematic side elevational view of a vibratory screening machine which can be used in the installation of FIG. 1 and which includes structure for adjusting the inclination of the screen bed.
Figure 4A:
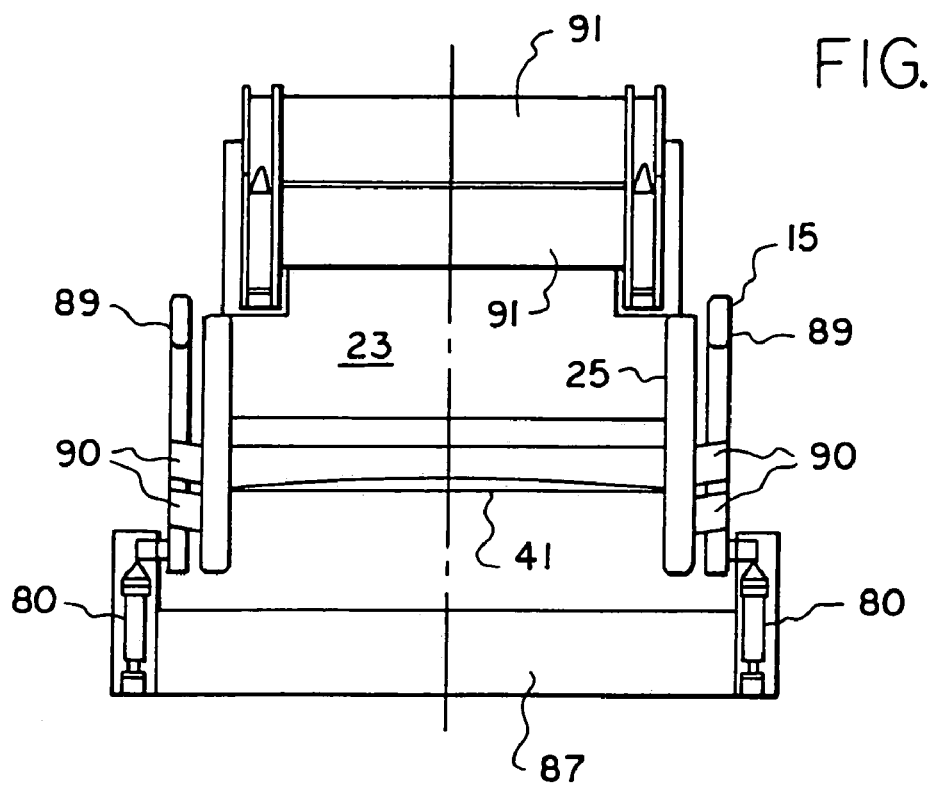
FIG. 4A is taken substantially in the direction of arrows 4A—4A of FIG. 4 and showing a schematic view of the structure for adjusting the angle of the vibratory frame.
Figure 11A:
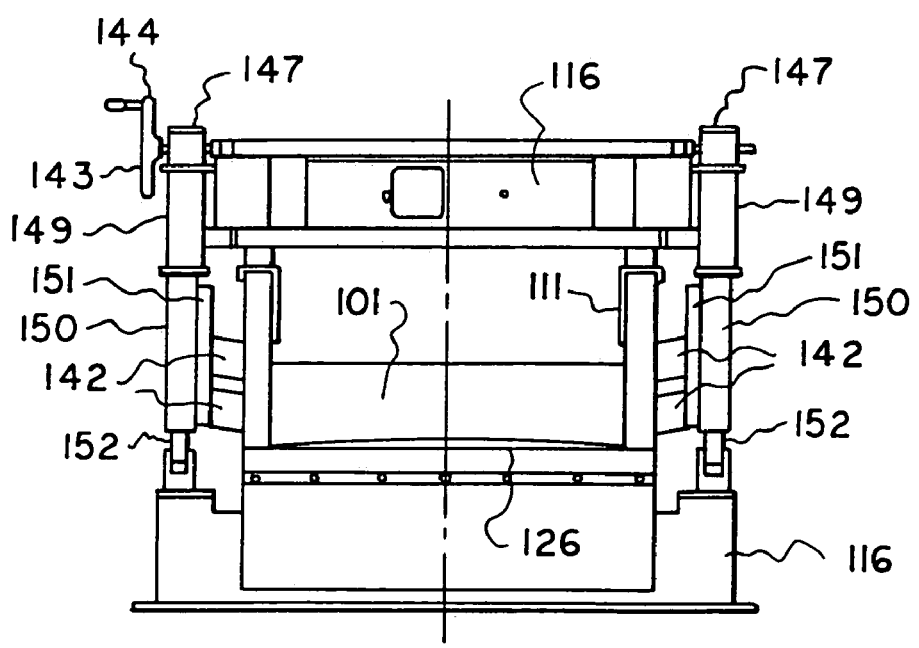
FIG. 11A is a schematic view taken substantially in the direction of arrows 11A—11A of FIG. 11 and showing the structure for adjusting the angle of the vibratory frame.
Figure 5:
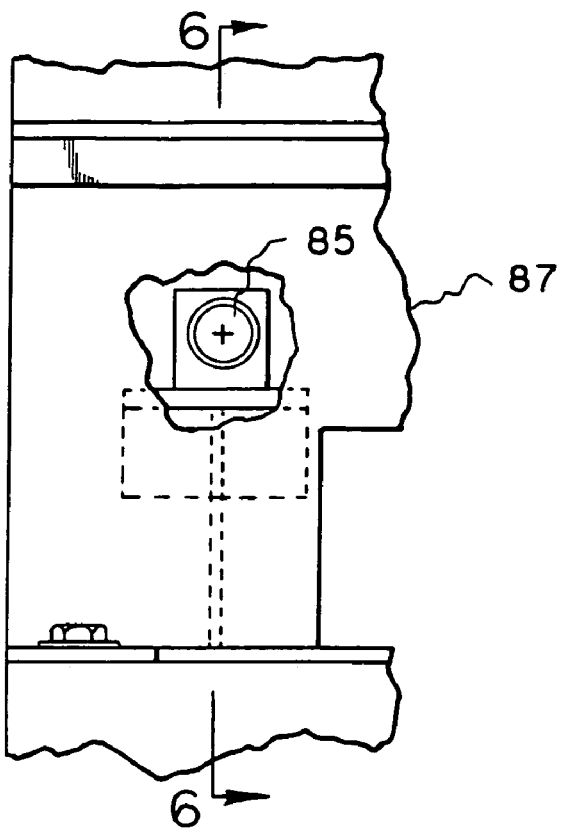
FIG. 5 is an enlarged fragmentary side elevational view of the pivot structure for the vibratory screening machine.
Figure 6:
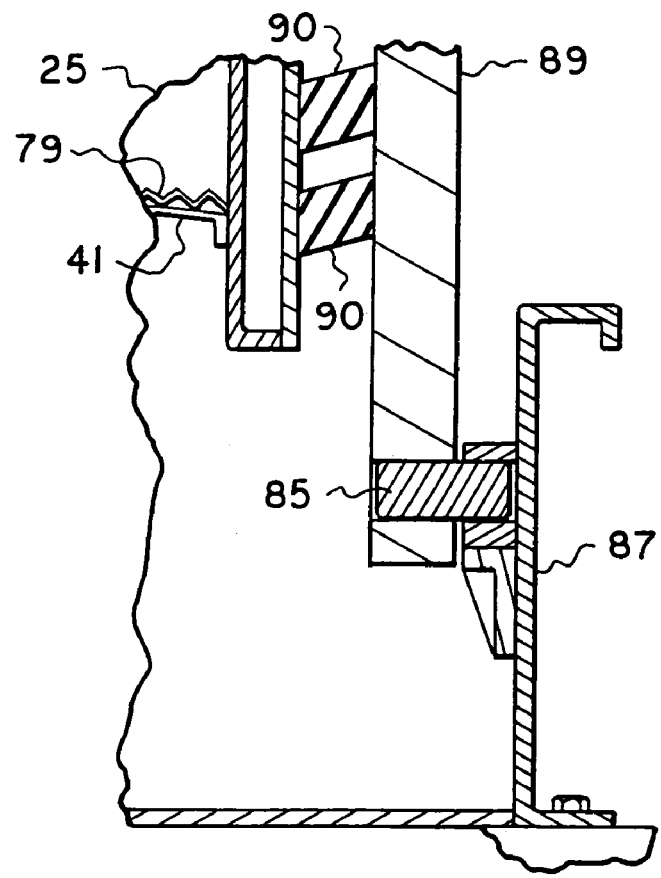
FIG. 6 is a fragmentary cross sectional view taken substantially along line 6—6 of FIG. 5.

In the vibratory screening machine 15 of FIG. 4, the inclination of the vibratory frame 25 can be adjusted by two piston and cylinder units 80 having their pistons 81 pivotally mounted relative to a fixed member 82 and the cylinders 83 of each pivotally mounted at 84 at the outer edges of the outer frame 89 at the end thereof remote from weir 24. The outer frame 89 is mounted on a hopper 87 which is a tank which receives the materials which pass through the screens on the screen bed 41. The outer frame 89 will pivot about a pivot 85 (FIGS. 4, 5 and 6) which is positioned between stationary base 87 and outer frame 89 of the vibratory screening machine on one side of the machine and another like aligned pivot (not shown) on the opposite side of the machine. The vibratory frame 25 is mounted on outer frame 89 by four pairs of resilient cylindrical members 90, with each pair being located at one of the four corner portions of the vibratory screening machine 15, as is well known in the art. As is also well known in the art, vibratory motors 91 are mounted on the vibratory frame 25 and they cause the vibratory frame to vibrate as permitted by the resilient cylindrical members 90. The above-described structure of the vibratory screening machine 15, exclusive of the feeder construction including the weir and seal construction, is known in the art. The feeder 23 is mounted on hopper 87 by a suitable bracket 96 which is attached to hopper 87.

The flexibility of the seal web 45 permits the inclination of the vibratory frame 25 to be changed in the above-described manner to meet varying screening conditions while maintaining a leak-proof relationship between the weir 37 and the vibratory frame 25. In the changing of inclination, the seal web 45 assumes different configurations but, as noted above, the seal maintains a leak-proof connection between the weir and the vibratory frame. In FIG. 7A the seal web 45 is shown in the configuration which it takes at line 7A—7A of FIG. 2. In FIG. 8A the seal web 45 shows the configuration which it takes at its extreme end when viewed in the direction of arrows 8A—8A of FIG. 2. In FIG. 7B the seal web 45 is shown in the configuration which it takes after the vibratory frame 25 has been pivoted counterclockwise about pivot 85 in FIG. 4, that is, when the inclination of the screen bed is raised away from the weir 37. The end 42 of the screen bed will thus move in the direction of the arrow in FIG. 7B and the seal web 45 may take a configuration such as shown in FIG. 7B. Additionally, when the end of the screen bed 25 remote from feeder 23 is raised as a result of the pivoting of the outer frame 89 about pivots 85, the tab 72 of the screen bed 25 will move in the direction of the arrow in FIG. 8B, that is, toward tab 40, and the seal web 45 will move from the position shown in FIG. 8A to that shown in FIG. 8B. In any event, the seal web 45 is sufficiently flexible so that it will permit the inclination of vibratory frame 25 to be adjusted between all operating limits to which it may be subjected. In this respect, a central angle of inclination of the screen bed might be three degrees upwardly away from the weir and, in the particular type of screening machine which is disclosed, the angle of inclination of the screen bed may be varied plus or minus four degrees from the central inclination of three degrees.

Figure 9:
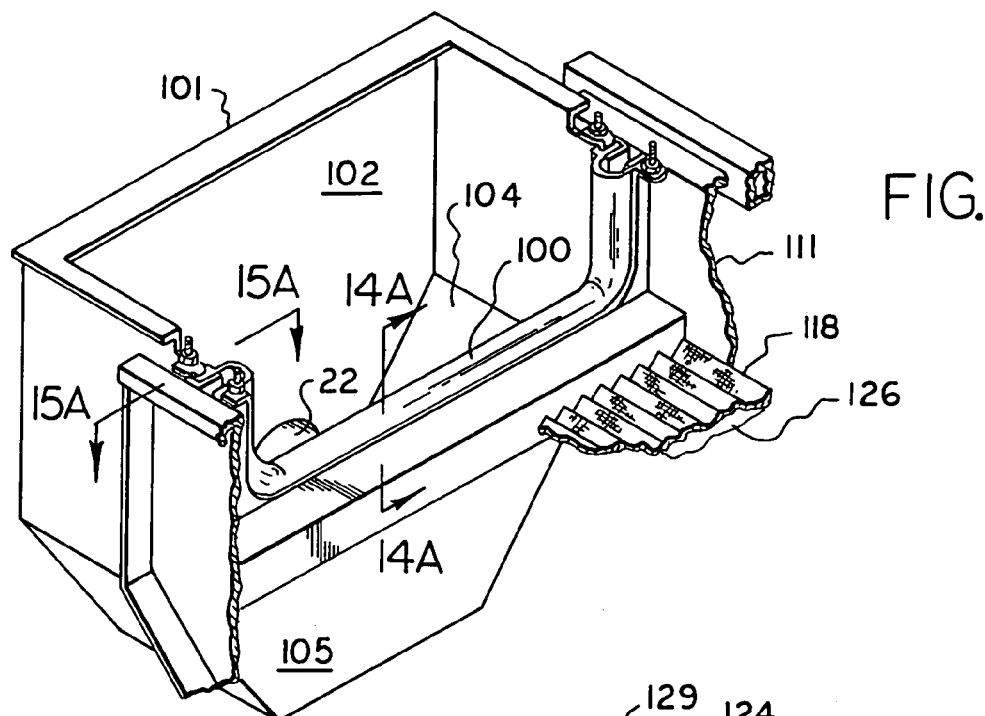
FIG. 9 is a fragmentary perspective view of another embodiment of a weir and seal construction between the feeder and the vibratory screen frame of the vibratory screening machine.
Figure 10:
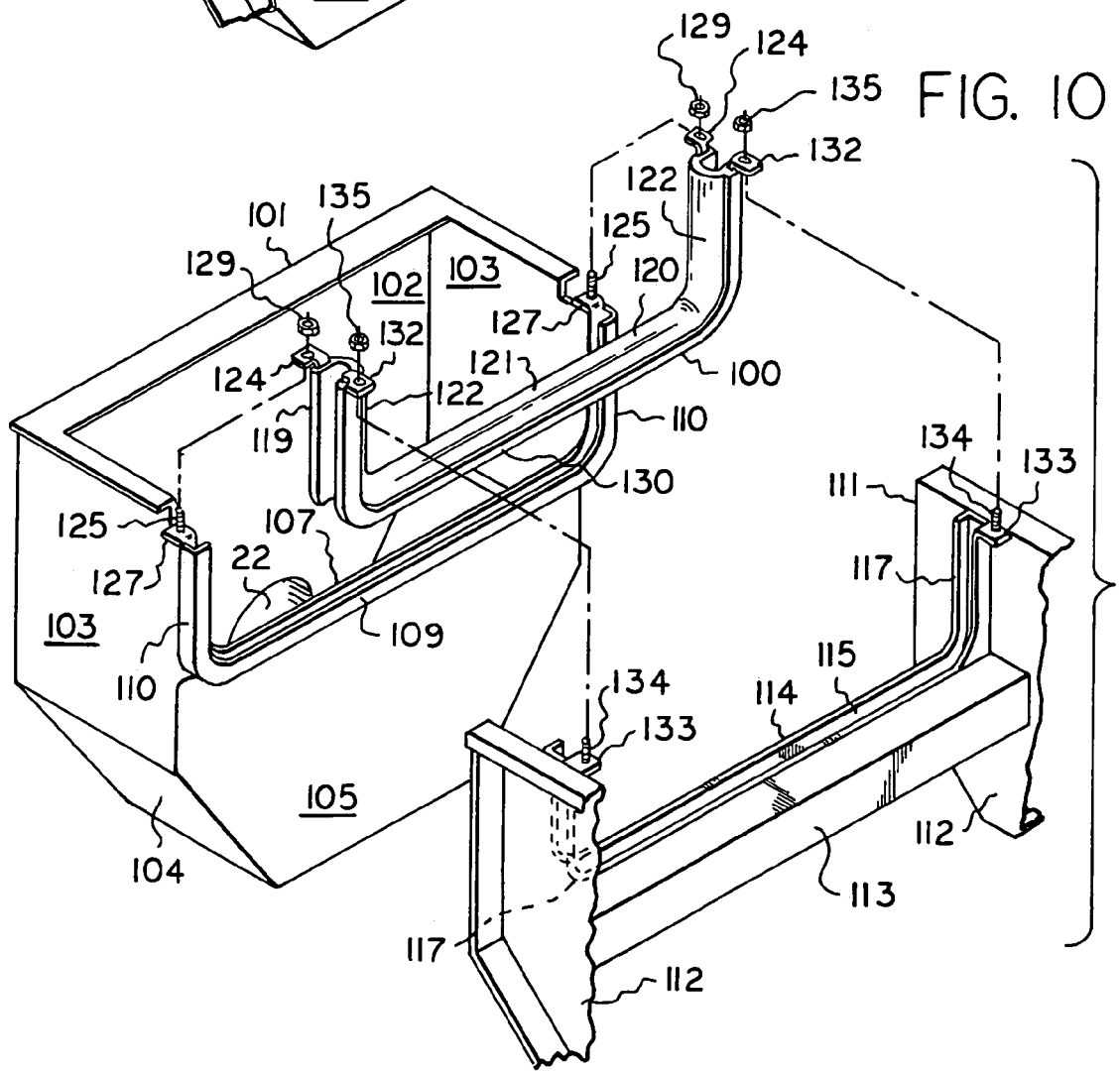
FIG. 10 is an exploded perspective view of the various parts of FIG. 9.
Figure 11:
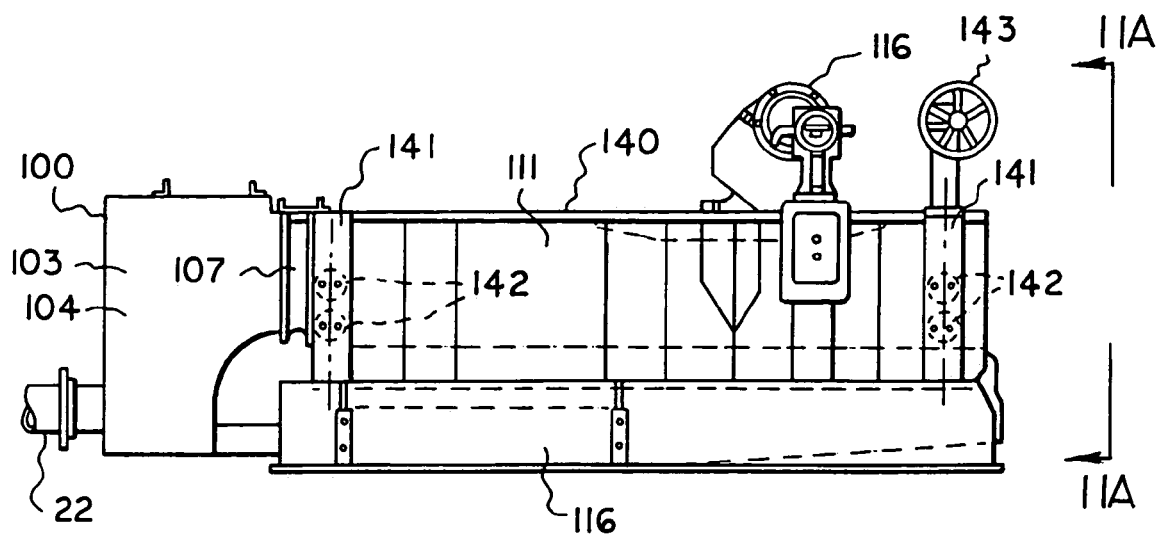
FIG. 11 is a schematic side elevational view of another type of vibratory screening machine having different structure for adjusting the inclination of the screen bed.

In FIGS. 9–15B another screening machine installation is shown wherein the weir has its lowermost point below the level of the outlet of the bell nipple 14, but the weir is a combination weir and seal 100. In FIGS. 9 and 10 the feeder 101 is connected to bell nipple outlet by conduit 22. It includes a rear wall 102, upper side walls 103, lower side walls 104 and a front wall 105. A U-shaped channel 107 has a central portion 109 and upstanding legs 110. The U-shaped channel 109 is secured to the front wall 105 and upper side walls 103 in fluid-tight relationship. The vibratory frame 111 includes side walls 112 which are connected by a structural member 113. A U-shaped channel 114 includes a central portion 115 and upstanding legs 117. The U-shaped channel 114 is secured to vibratory frame 111 in fluid-type relationship.

The combined weir and seal 100 is mounted in fluid-tight relationship between feeder 101 and vibratory frame 111. In this respect, a U-shaped bead 119 is formed at one side of flexible seal web 120 which has a central portion 121 and upstanding sides 122. A U-shaped metal bar 123 is molded within bead 119, and it has tabs 124 formed at its upper ends. Bead 119 fits into channel 107, and tabs 124 receive bolts 125 which extend upwardly from tabs 127 at the upper ends of channel 107. Nuts 129 tighten down on bolts 125 to thereby force bead 119 into sealing engagement with channel 107.

The opposite side of combined weir and seal 100 is installed in sealing engagement with channel 114 on vibratory frame 111. In this respect, a U-shaped bead 130 is formed at the opposite side of seal web 121, and it includes a U-shaped bar 131 molded therein which has tabs 132 formed at its upper ends. Channel 114 on vibratory frame 111 has tabs 133 formed at the upper end thereof, and bolts 134 extend upwardly therefrom. Tabs 132 at the ends of beads 130 have apertures therein which fit over bolts 134, and nuts 135 are tightened down onto bolts 134 to force bead 130 into sealing engagement with U-shaped channel 114.

The combined weir and seal 100 discussed above relative to FIGS. 9, 10, 14A, 14B, 15A and 15B is utilized in vibratory screening machine 140 having four outer frame posts 141 on which inner vibratory frame 111 having vibratory motors 116 thereon is resiliently mounted by four pairs of cylindrical resilient members 142, with each pair being located at one of the four posts 141 of the machine between the four posts 141 and the vibratory frame 111. Each frame post 141 is mounted on hopper 116 which receives the materials which pass through screen 118 on screen bed 126. This structure is well known in the art.

The vibratory screening machine 140 also has an inclination adjuster 143 which raises and lowers the end of the vibratory frame 111 which is remote from combined seal and weir 107. The inclination adjuster 143 consists of a wheel 144 which turns a shaft 145 having bevel gear boxes 147 associated therewith which turn vertical shafts (not shown) in housings 149. The shafts have screw threads thereon which mate with nuts fixedly secured to the insides of housings 150 to thereby move housings 149 up and down without rotation thereof. Housings 150 have brackets 151 thereon to which resilient members 142, which are attached to vibratory frame 111, are secured. Rods 152 are pivotally mounted on hopper 116 and they permit sleeves 150 to slide longitudinally thereon. Thus, by the turning of wheel 144, the end of vibratory frame 111 may be raised and lowered to adjust the angle of vibratory frame 111. This structure is well known in the art. When the inclination of the right end of the vibratory screen is changed, the vibratory screen will pivot about the center point 144 (FIG. 12) between the two resilient members 142 on each side of the machine adjacent to feeder 101. It can be seen from FIG. 12 that the center of pivotal motion of vibratory frame 111 is substantially in line with tabs 132 substantially at the end of seal bead 130.

Figure 14A:
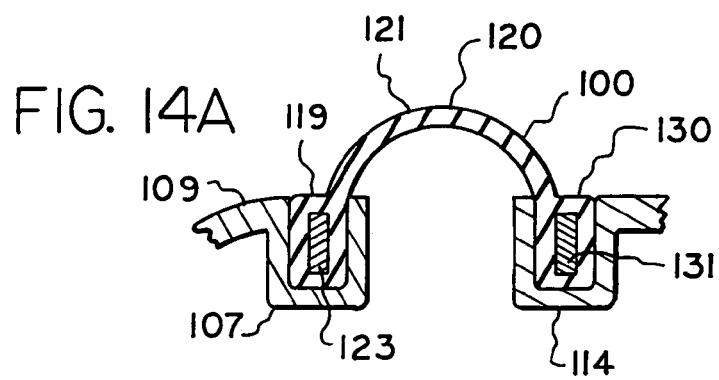
FIG. 14A is an enlarged fragmentary cross sectional view taken substantially along line 14A-14A of FIG. 9 and showing the connection of the combined weir and seal between the feeder and the vibratory frame and also showing the contour of the seal web in the position of FIG. 9.
Figure 14B:
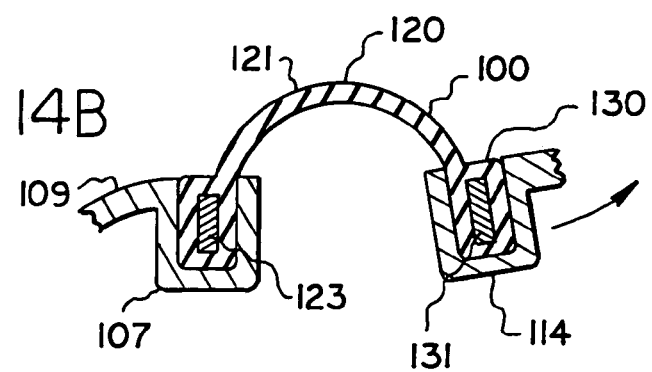
FIG. 14B is a fragmentary cross sectional view similar to FIG. 14A and showing the contour of the seal web when the end of the screen bed remote from the feeder has been raised from the position represented by FIG. 14A.

Because of the foregoing orientation between pivot center 144 and bead 130, the deflection of seal web 120 will occur as represented by FIGS. 14A, 14B, 15A and 15B. In this respect, FIG. 14A essentially represents the contour of the seal web 120 at section line 14A—14A. The contour of the end of seal web 120 corresponding to the position of FIG. 14A is shown in FIG. 15A. When the right end of the vibratory frame 111 is pivoted counterclockwise in FIG. 11 about pivot center 144, the contour of the seal web 120 at portion 14A is depicted in FIG. 14B. The corresponding contour of the end of seal web 120 is shown in FIG. 15B because seal bead 130 will approach seal bead 119, as shown by the arrow in FIG. 15B.

Figure 2:
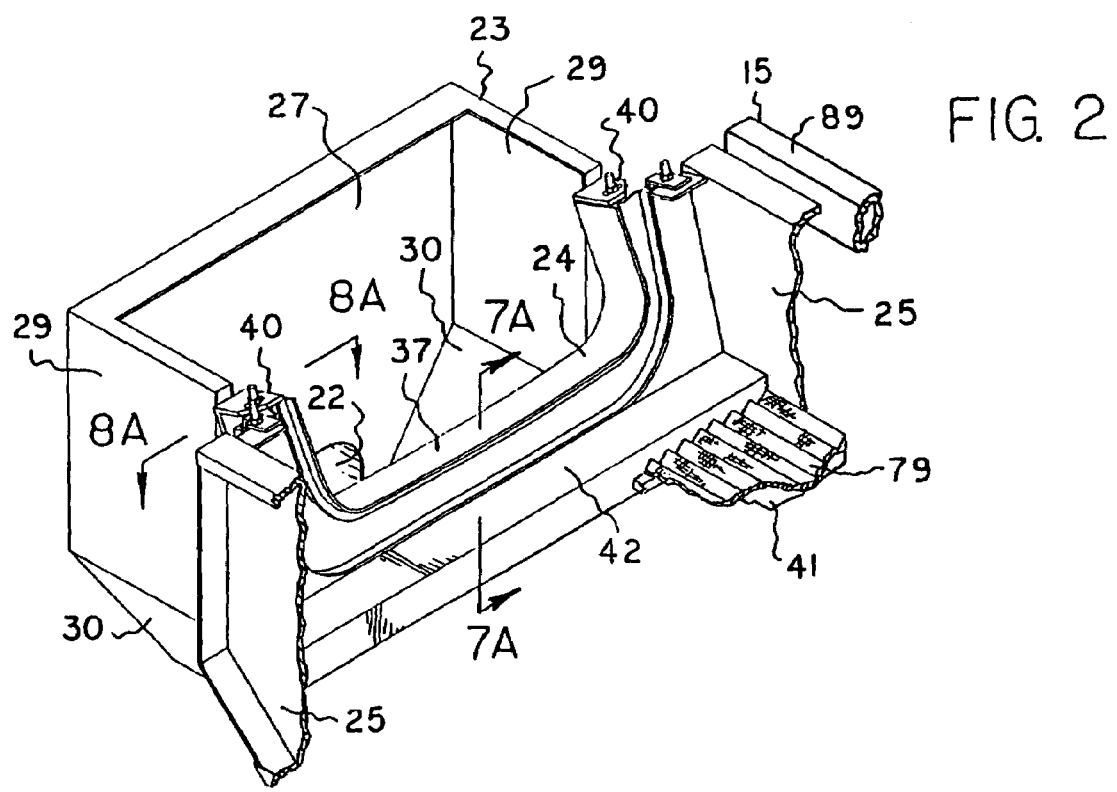
FIG. 2 is a fragmentary perspective view of a weir and seal construction which is located between the feeder and the vibratory screen frame of the vibratory screening machine.
Figure 3:
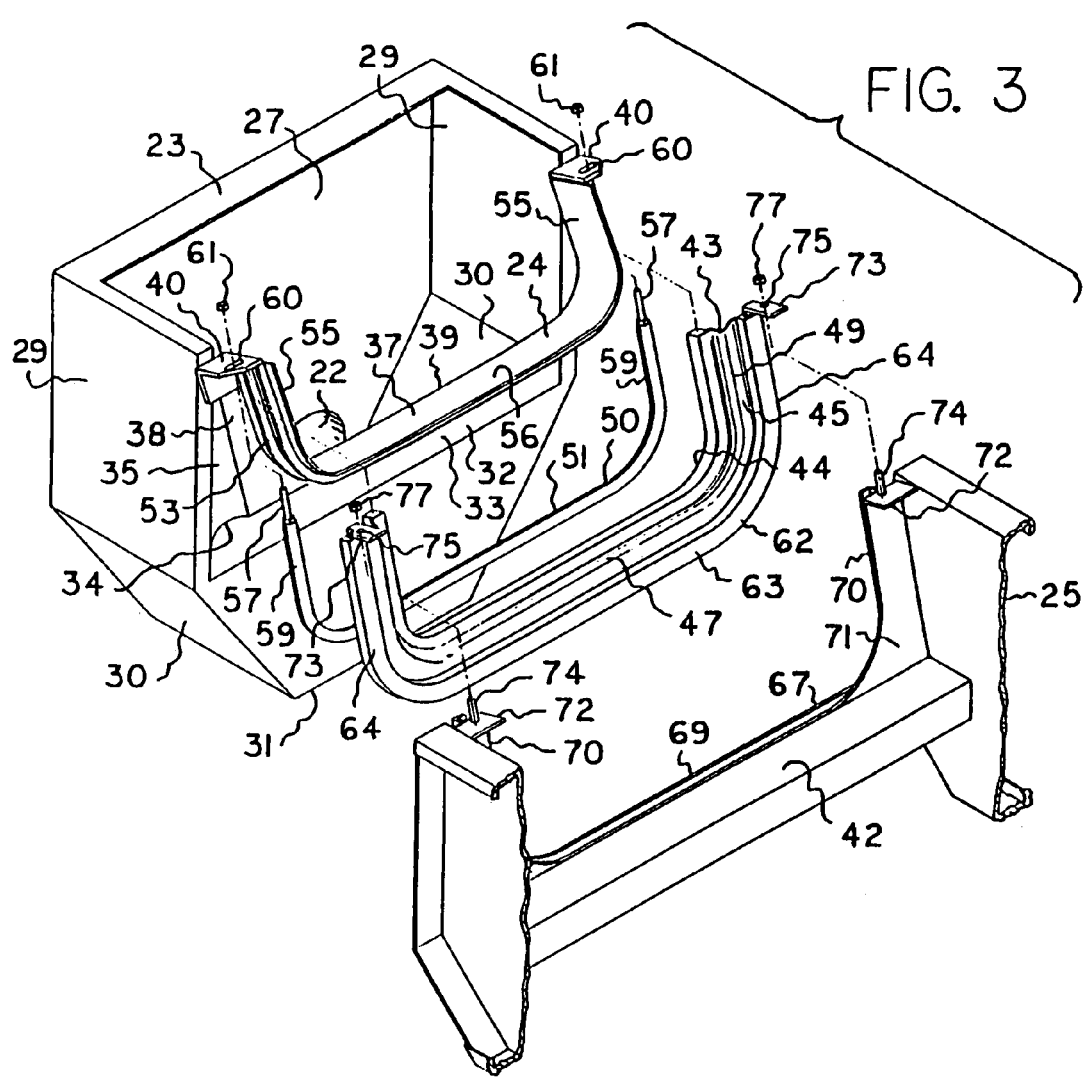
FIG. 3 is an exploded perspective view of various parts of FIG. 2.

From the foregoing it can be seen that the inclination of the vibratory frame can be adjusted relative to the feeder with two different types of fluid-tight connections therebetween. In the connection of FIG. 3, the weir 37 is rigidly affixed to the feeder 23, and the seal 43 is affixed between the weir 37 and the vibratory frame 25 so as to provide a flexible connection therebetween. In the embodiment of FIG. 10, the fluid-tight connection between the feeder 101 and the vibratory frame 111 is by means of a combined weir and seal 100 which serves the dual function of both a weir and a seal. The reason that it can do so is because the elevation of the flexible web 120 does not change appreciably with the changes in inclination of the screen bed of the vibratory frame. The reason that the weir 37 has to be fixed in the embodiment of FIG. 2 is because the pivot point of the vibratory frame 25 is relatively low so that a sufficiently great distortion will occur in the web 43 of the seal, as represented by FIGS. 7A, 7B, 8A and 8B. In contrast to the foregoing, the pivot point 144 of the vibratory frame 111 is much higher up than the pivot point 85 so that there is not that much distortion of the seal web 120 at the various inclinations of the vibratory frame.

The flexible seal 43 of FIGS. 2–8B and the flexible seal 100 of FIGS. 9–15B are fabricated of nitrile rubber, but it will be appreciated that any other suitable flexible material may be used.

While preferred embodiments of the present invention have been disclosed, it will be appreciated that it is not limited thereto but may be otherwise embodied within the scope of the following claims.

The invention claimed is:

1. A vibratory screening machine and feeder combination comprising:
   a feeder,
   a vibratory screening machine,
   an angularly adjustable vibratory frame on said vibratory screening machine,
   a weir between said feeder and said adjustable vibratory frame, and
   a flexible seal between said weir and said adjustable vibratory frame, wherein a first edge of said flexible seal sealingly engages a first channel located on the weir, and a second edge of said flexible seal sealingly engages a second channel located on the vibratory frame.

2. The vibratory screening machine and feeder combination as set forth in claim 1 wherein said weir is a part of said feeder.

3. The vibratory screening machine and feeder combination as set forth in claim 2 wherein said seal includes a flexible web between said first and second edges.

4. The vibratory screening machine and feeder combination as set forth in claim 3 including first and second beads on said first and second edges, respectively.

5. The vibratory screening machine and feeder combination as set forth in claim 4 further comprising:
   a first clamping bar pressing said first bead into said first channel, and
   a second clamping bar pressing said second bead into said second channel.

6. The vibratory screening machine and feeder combination as set forth in claim 1 including a combined weir and seal between said feeder and said vibratory frame.

7. The vibratory screening machine and feeder combination as set forth in claim 6 wherein said combined weir and seal includes a flexible web.

8. The vibratory screening machine and feeder combination as set forth in claim 7 further comprising:
   said first and second edges on said combined weir and seal, and
   first and second beads on said first and second edges.

9. The vibratory screening machine and feeder combination as set forth in claim 8 further comprising:
   a first clamping bar pressing said first bead into said first channel, and
   a second clamping bar pressing said second bead into said second channel.

* * * * *